United States Patent
Sakai

(10) Patent No.: US 11,400,536 B2
(45) Date of Patent: Aug. 2, 2022

(54) METAL LAMINATING AND MODELING METHOD

(71) Applicant: MITSUBISHI HEAVY INDUSTRIES COMPRESSOR CORPORATION, Tokyo (JP)

(72) Inventor: Yasunori Sakai, Hiroshima (JP)

(73) Assignee: MITSUBISHI HEAVY INDUSTRIES COMPRESSOR CORPORATION, Tokyo (JP)

( * ) Notice: Subject to any disclaimer, the term of this patent is extended or adjusted under 35 U.S.C. 154(b) by 168 days.

(21) Appl. No.: 16/843,193

(22) Filed: Apr. 8, 2020

(65) Prior Publication Data

US 2020/0324357 A1 Oct. 15, 2020

(30) Foreign Application Priority Data

Apr. 11, 2019 (JP) .............................. JP2019-075571

(51) Int. Cl.
*B23K 9/04* (2006.01)
*B33Y 10/00* (2015.01)

(52) U.S. Cl.
CPC ............... *B23K 9/044* (2013.01); *B33Y 10/00* (2014.12)

(58) Field of Classification Search
CPC .... B23K 9/044; B23K 9/046; B23K 37/0461; B23K 10/027; B23K 11/0013;

(Continued)

(56) References Cited

U.S. PATENT DOCUMENTS 9,835,114 B1 * 12/2017 Gradl ..................... B23K 9/046
2014/0197576 A1 * 7/2014 Kraibuhler ............. B33Y 10/00
425/375

(Continued)

FOREIGN PATENT DOCUMENTS

JP 2007-275945 A 10/2007
JP 2018-162500 A 10/2018

(Continued)

OTHER PUBLICATIONS

K. S. Derekar; "A review of wire arc additive manufacturing and advances in wire arc additive manufacturing of aluminium"; Materials Science and Technology; vol. 34, No. 8; Apr. 8, 2018 (Apr. 8, 2018); pp. 895-916; XP055728848; GB ISSN: 0267-0836; DOI: 10.1080/02670836.2018.1455012 (23 pages).

*Primary Examiner* — Christopher J Besler
*Assistant Examiner* — Christine Bersabal
(74) *Attorney, Agent, or Firm* — Osha Bergman Watanabe & Burton LLP

(57) ABSTRACT

In a metal laminating and modeling method, a three-dimensional modeled object 10 having a main surface 12 and an outer circumferential surface 13 is modeled by sequentially laminating a plurality of metal layers 11*m*. The metal laminating and modeling method has a metal layer formation step of forming the metal layers 11*m* by forming a plurality of weld beads 100 so as to be arranged in a horizontal direction on a table 2, and a first end portion weld bead formation step of inclining the table 2 such that a target surface 2*f* faces in a first inclination direction and forming first end portion weld beads 100*a* so as to overlap, among a plurality of center weld beads 100*c*, the center weld beads 100*c* located at an uppermost end in a vertical direction Dv.

4 Claims, 8 Drawing Sheets

(58) Field of Classification Search
CPC ...... B23K 26/342; B33Y 10/00; B33Y 50/02; B33Y 30/00; F05D 2230/31
See application file for complete search history.

(56) References Cited

U.S. PATENT DOCUMENTS

2019/0375011 A1   12/2019   Nakamura et al.
2020/0038983 A1   2/2020    Sato et al.

FOREIGN PATENT DOCUMENTS

WO   2018/097298 A1   5/2018
WO   2020/085194 A1   4/2020

* cited by examiner

METAL LAMINATING AND MODELING METHOD

BACKGROUND OF THE INVENTION

Field of the Invention

The present invention relates to a metal laminating and modeling method.

Priority is claimed on Japanese Patent Application No. 2019-075571, filed on Apr. 11, 2019, the content of which is incorporated herein by reference.

Description of Related Art

As one of 3D printing (three-dimensional modeling) techniques, a technique of laminating and modeling metal has been developed and put into practical use. As this kind of a metal laminating and modeling method, a molten metal lamination method in which a modeled object is formed by laminating metal layers using metal molten by an arc discharge. The metal layer is formed by forming weld beads using metal molten by an arc discharge and arranging a plurality of these weld beads.

At the time of forming a modeled object by the molten metal lamination method, there is a case where the molten metal falls down. As a result, the metal that has fallen down forms large protrusions and recesses on the surface of the modeled object and impairs the quality of the surface. Therefore, there is a case where the surface of the modeled object is trimmed by carrying out a finish process in order to remove protrusions and recesses formed by the molten metal that has fallen down and solidified, which takes time and effort.

In contrast, for example, Japanese Unexamined Patent Application, First Publication No. 2018-162500 discloses a method in which the temperature of weld beads for a laminated previous layer is monitored and the lamination of weld beads for the subsequent layer begins when the temperature of the weld beads reaches a predetermined temperature or lower. According to such a method, the falling-down of the weld bead for the previous layer is suppressed.

SUMMARY OF THE INVENTION

However, in the method disclosed by Japanese Unexamined Patent Application, First Publication No. 2018-162500, a temperature sensor for monitoring the temperature of the weld beads is required, and weld beads for the subsequent layer are not laminated until the weld beads reach a predetermined temperature or lower. As a result, there is a case where time is taken for the formation of a modeled object.

An object of the present invention is to provide a metal laminating and modeling method capable of forming a modeled object with a favorable quality within a shorter period of time.

A metal laminating and modeling method according to a first aspect of the present invention is a metal laminating and modeling method for modeling a three-dimensional modeled object having a main surface and a side surface extending in a direction intersecting with the main surface from an end portion of the main surface by sequentially laminating metal layers, the method comprising: a metal layer formation step of forming one of the metal layers by forming a plurality of weld beads formed by arc welding so as to be arranged in a horizontal direction on a table having a target surface on which the metal layers are to be formed, in which the metal layer formation step has a center portion weld bead formation step of setting the table in a horizontal state such that the target surface faces upward in a vertical direction and forming the plurality of weld beads so as to be overlapped in a direction in which the target surface extends and a first end portion weld bead formation step of inclining the table such that the target surface faces in a first inclination direction intersecting with the vertical direction and forming at least one first end portion weld bead so as to overlap, among the plurality of weld beads formed in the center portion weld bead formation step, the weld beads located at an uppermost end in the vertical direction.

When the metal laminating and modeling method is configured as described above, at a point in time at which the first end portion weld beads are formed, the first end portion weld beads are located above the plurality of weld beads. At the moment of being formed, the first end portion weld beads are in a molten state and thus flow toward the plurality of weld beads due to the force of gravity. That is, the first end portion weld beads do not flow toward a side where the plurality of weld beads is not formed. As a result, it is possible to prevent the side of the modeled object from forming a shape having large protrusions and recesses due to the weld beads that hangs down. Therefore, it is possible to produce a favorable modeled object having a small number of protrusions and recesses even when the side surface of the modeled object is not pruned. Therefore, it is not necessary to wait for the weld beads to lower to a predetermined temperature, and thus the modeling time can be shortened.

In addition, in a metal laminating and modeling method according to a second aspect of the present invention, in the first aspect, the metal layer formation step may have a second end portion weld bead formation step of forming at least one second end portion weld bead so as to overlap, among the plurality of weld beads formed in the center portion weld bead formation step, a weld bead located at an end opposite to the end at which at least one first end portion weld bead is formed, and, in the second end portion weld bead formation step, the table may be inclined such that the at least one second end portion weld bead is located above the plurality of weld beads in the vertical direction.

When the metal laminating and modeling method is configured as described above, at a point in time at which the second end portion weld beads are formed, the second end portion weld beads are located above the plurality of weld beads. At the moment of being formed, the second end portion weld beads are in a molten state and thus flow toward the plurality of weld beads due to the force of gravity. However, the second end portion weld beads in a molten state are blocked by the plurality of weld beads and not capable of flowing downward any further. Therefore, it is possible to produce a favorable modeled object having a small number of protrusions and recesses even when a surface facing a side opposite to the side surface is not pruned. Therefore, it is possible to improve the qualities of two different surfaces intersecting with the main surface of the modeled object without carrying out an additive process or the like.

In addition, in a metal laminating and modeling method according to a third aspect of the present invention, in the first aspect or the second aspect, the metal layer formation step may be executed a plurality of times such that the weld beads are laminated on the formed metal layers.

When the metal laminating and modeling method is configured as described above, the metal layers having the first end portion weld beads are sequentially laminated. As a result, it is possible to enhance the quality of the modeled object without carrying out an additive process or the like and make the cutting process time of the side surface short or unnecessary.

In addition, in a metal laminating and modeling method according to a fourth aspect of the present invention, in the third aspect, the metal laminating and modeling method may further have a side surface formation step of inclining the table such that the at least one of first end portion weld bead is disposed above and forming the plurality of weld beads on a plurality of first end portion weld beads to form the side surface, the side surface formation step being carried out after the metal layer formation step is executed a plurality of times.

When the metal laminating and modeling method is configured as described above, the weld beads are formed so as to overlap the plurality of first end portion weld beads. Therefore, even when there are a small number of protrusions and recesses or the like on the surface of the arranged first end portion weld beads, the protrusions and the recesses or the like are buried by weld beads to be newly formed. As a result, a leveled side surface is formed. Therefore, it is possible to further enhance the finish quality of the side surface and make the cutting process time of the side surface short or unnecessary.

In addition, in a metal laminating and modeling method according to a fifth aspect of the present invention, in any one of the first aspect to the fourth aspect, the modeled object may have a tubular portion extending in an axial direction, the main surface may be a surface extending so as to intersect with the axial direction in at least one end portion of the tubular portion in the axial direction, and the side surface may be at least one of an outer circumferential surface and an inner circumferential surface of the tubular portion.

When the metal laminating and modeling method is configured as described above, the first end portion weld beads are formed by inclining the table. As a result, it is possible to form a modeled object having a high quality without carrying out any additive process.

According to the present invention, it becomes possible to suppress an increase in facility costs, suppress the extension of modeling time, and form modeled objects with a favorable quality.

DETAILED DESCRIPTION OF THE INVENTION

Hereinafter, an embodiment for carrying out a metal laminating and modeling method according to the present invention will be described with reference to drawings. However, the present invention is not limited only to this embodiment.

Figure 1:
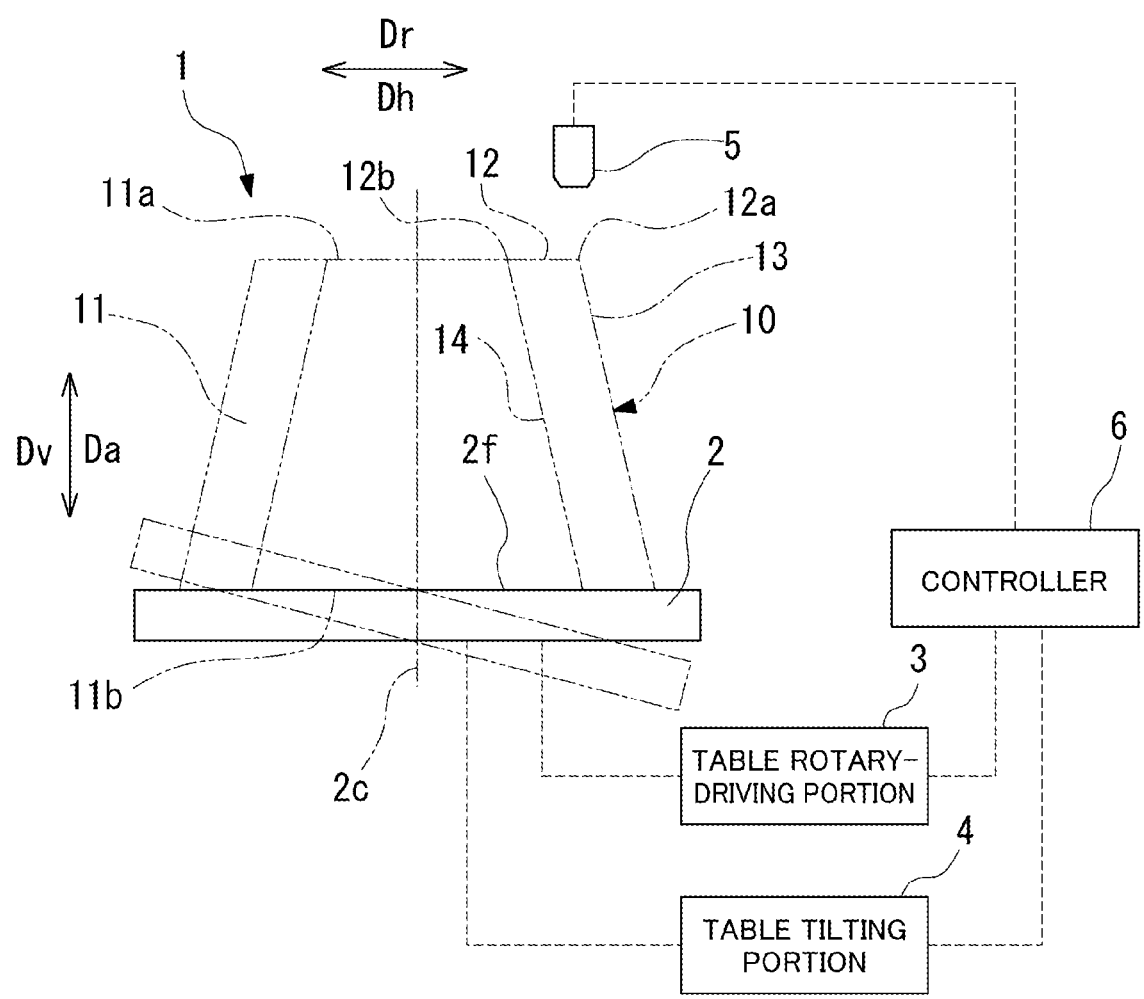
FIG. 1 is a schematic view showing the configuration of a modeling system for forming a modeled object using a metal laminating and modeling method according to the embodiment of the present invention.

FIG. 1 is a schematic view showing the configuration of a modeling system for forming a modeled object using a metal laminating and modeling method according to the embodiment of the present invention. As shown in FIG. 1, a modeling system 1 of the present embodiment includes a table 2, a table rotary-driving portion 3, a table tilting portion 4, a welding nozzle 5, and a controller 6. The modeling system 1 includes a machining center or the like capable of carrying out so-called numerical control (NC).

The table 2 has a target surface $2f$ facing upward in a vertical direction Dv. The target surface $2f$ is a plane extending from a central axis $2c$ of the table 2 as the center in a direction orthogonal to the central axis $2c$. On the target surface $2f$, metal layers $11m$ intended to form a modeled object 10 are sequentially laminated. The table 2 is rotatable around the central axis $2c$. The table 2 is tiltable so that the central axis $2c$ inclines at a predetermined angle with respect to the vertical direction. In the table 2, a state in which the central axis $2c$ extends in the vertical direction Dv and the target surface $2f$ faces upward in the vertical direction Dv is a horizontal state.

The table rotary-driving portion 3 rotates the table 2 around the central axis $2c$. The table tilting portion 4 tilts the table 2. The table tilting portion 4 inclines the table 2 in a direction in which the target surface $2f$ intersects with the vertical direction Dv from the horizontal state.

The welding nozzle 5 forms weld beads 100 by arc welding in which a weld wire is molten by an arc generated in a shielding gas (inert gas). The welding nozzle 5 is movable relative to the table 2. The welding nozzle 5 is installed in a multiaxial arm (not shown) that is movable relative to the table 2.

The controller 6 controls the respective portions of the modeling system 1. The controller 6 controls the rotary operation of the table 2 by the table rotary-driving portion 3 and the tilting operation of the table 2 by the table tilting portion 4. In addition, the controller 6 controls the location of the welding nozzle 5 or conditions for forming the weld beads 100 using the welding nozzle 5 (so-called welding conditions).

As the welding conditions controlled using the controller 6, for example, there are a welding current to be supplied to a heat source for melting weld wires, an arc voltage, a welding rate, weaving conditions for adjusting the width or shape of the weld bead 100, a pulse current, a preheating temperature of weld wires (base metal), an interpass temperature, the surface roughness of the modeled object 10 under modeling, the feed speed of weld wires, a weld wire diameter, the aiming location of a weld arc with respect to the weld beads 100 that have been already formed, the extrusion length of a weld wire, the composition or flow rate of the shielding gas, and the like. The controller 6 controls at least one of the above-described conditions.

The modeled object 10 to be formed by the above-described modeling system 1 is to be formed on the table 2. The modeled object 10 of the present embodiment has a tubular portion 11 forming a cylindrical shape. As the modeled object 10 having the tubular portion 11, for example, nozzles that form suction ports or ejection ports in the casings of rotary machinery such as a turbine or a compressor are exemplary examples. The tubular portion 11 is formed on the table 2 in a state in which the axial line thereof is aligned with the central axis 2c. The tubular portion 11 extends in an axial direction Da in which the axial line extends. The axial direction Da of the present embodiment is the vertical direction Dv in a case where the table 2 is set in the horizontal state. The outer diameter dimension of the tubular portion 11 gradually increases from a tube end 11a on one side (first side) toward a tube end 11b on the other side (second side) in the axial direction Da. The tubular portion 11 has a main surface 12, an outer circumferential surface (side surface) 13, and an inner circumferential surface (side surface) 14.

The main surface 12 is formed at an end portion in the axial direction Da in the tubular portion 11. The main surface 12 is formed orthogonal to the axial direction Da. The main surface 12 is, among surfaces facing in the axial direction Da in the tubular portion 11 on the table 2, a surface not in contact with the target surface 2f. The main surface 12 of the present embodiment is a plane forming a toric shape when seen in the axial direction Da.

The outer circumferential surface 13 extends in a direction intersecting with the main surface 12 from an outside end portion 12a on the outermost side in a radial direction Dr of the main surface 12 when seen in the direction orthogonal to the central axis 2c. The outer circumferential surface 13 of the present embodiment is a curving surface. The radial direction Dr of the present embodiment is a direction in which the axial line of the tubular portion 11 extends from the center and a horizontal direction Dh in a case where the table 2 is set in the horizontal state. The inner circumferential surface 14 extends in the direction intersecting with the main surface 12 from an inside end portion 12b on the innermost side in the radial direction Dr of the main surface 12 when seen in the direction orthogonal to the central axis 2c. The inner circumferential surface 14 of the present embodiment extends at an angle that is almost zero degree with respect to the outer circumferential surface 13. The inner circumferential surface 14 of the present embodiment is a curving surface.

Figure 2:
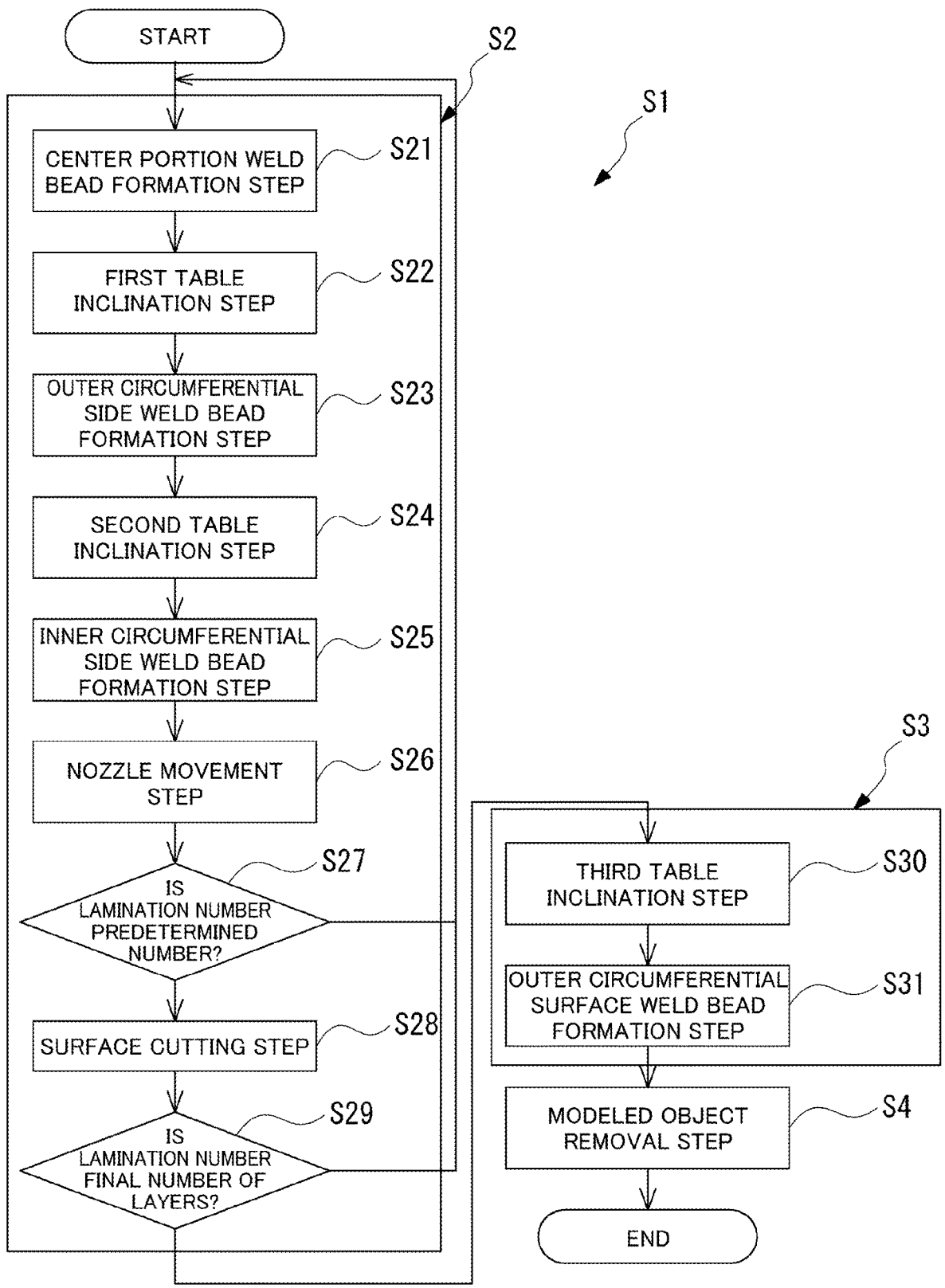
FIG. 2 is a flowchart showing the flow of the metal laminating and modeling method.

Next, a metal laminating and modeling method S1 carried out using the modeling system 1 will be described. FIG. 2 is a flowchart showing the flow of the metal laminating and modeling method. As shown in FIG. 2, in the metal laminating and modeling method S1, a three-dimensional modeled object is modeled by sequentially laminating a plurality of metal layers. The metal laminating and modeling method S1 of the present embodiment has a metal layer formation step S2, a side surface formation step S3, and a modeled object removal step S4.

In the metal layer formation step S2, a plurality of the weld beads 100 formed by arc welding is formed so as to be arranged in the horizontal direction Dh, thereby forming a metal layer 11m. The metal layer formation step S2 is executed a plurality of times. The metal layer formation step S2 is repeatedly executed, whereby the weld beads 100 are further laminated on the metal layer 11m that has been already formed. Therefore, a plurality of the metal layers 11m is laminated on the target surface 2f. The metal layer formation step S2 of the present embodiment has a center portion weld bead formation step S21, a first table inclination step S22, an outer circumferential side weld bead formation step (first end portion weld bead formation step) S23, a second table inclination step S24, an inner circumferential side weld bead formation step (second end portion weld bead formation step) S25, a nozzle movement step S26, a lamination number confirmation step S27, a surface cutting step S28, and a final lamination number confirmation step S29.

Figure 3:
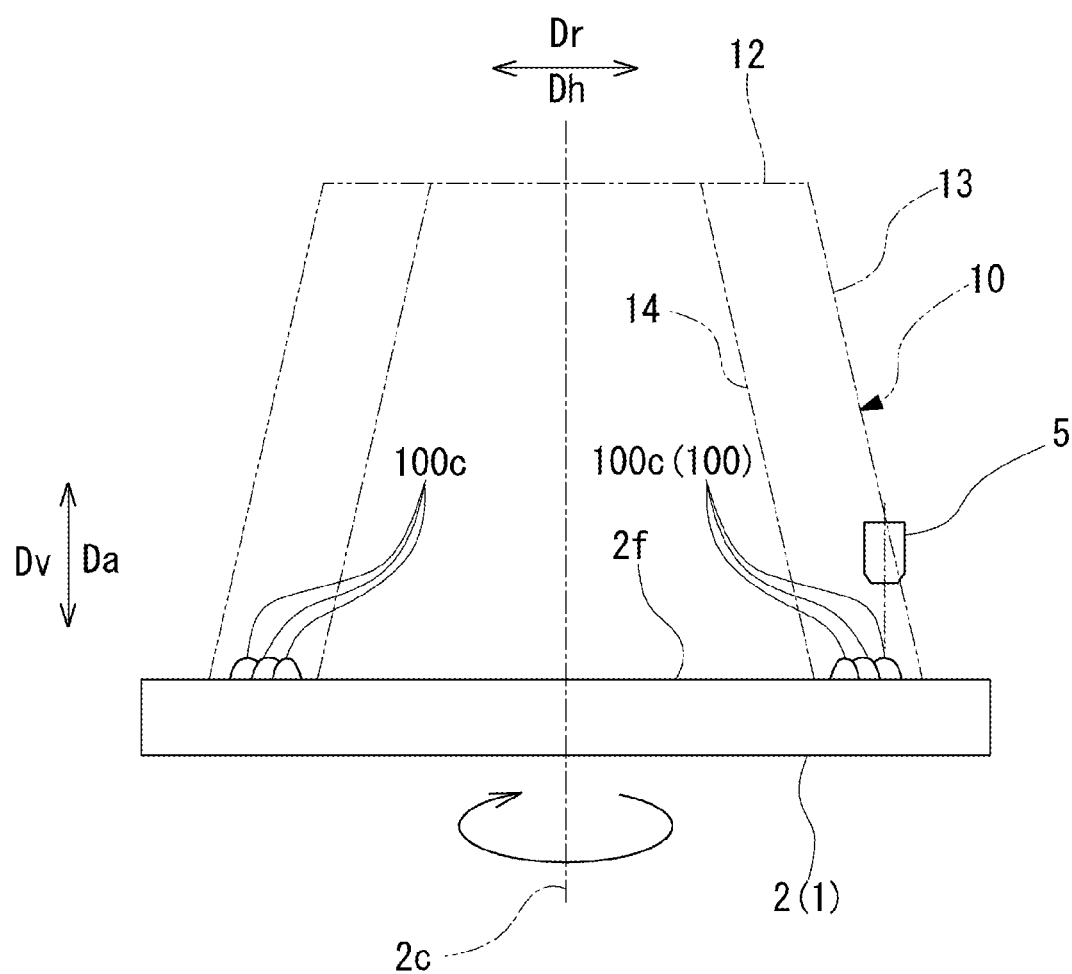
FIG. 3 is a view showing a state in which, in the metal laminating and modeling method, a plurality of weld beads is formed while a table is rotated in a horizontal state.

As shown in FIG. 3, in the center portion weld bead formation step S21, the weld beads 100 are formed using the welding nozzle 5 on the table 2 rotating around the central axis 2c. In the center portion weld bead formation step S21, the table 2 is maintained in the horizontal state so as to keep the target surface 2f facing upward in the vertical direction Dv. In the center portion weld bead formation step S21, the table 2 is rotated using the table rotary-driving portion 3 (refer to FIG. 1) around the central axis 2c at a predetermined rotation speed. The weld beads 100 are formed while the table 2 is rotated, whereby the weld beads 100 are continuously formed in a circle around the central axis 2c. In the center portion weld bead formation step S21, when reaching an end portion of the weld beads 100 in a circumferential direction around the central axis 2c, the welding nozzle 5 is moved in the radial direction Dr orthogonal to the central axis 2c. As a result, the weld beads 100 are formed side by side across a plurality of rows in the direction orthogonal to the central axis 2c. Therefore, a plurality of center weld beads 100c is formed along the target surface 2f so as to be overlapped in the horizontal direction Dh that is the direction in which the target surface 2f extends. These plurality of rows of the center weld beads 100c forms a central region in the radial direction Dr in one metal layer 11m when seen in the direction orthogonal to the central axis 2c.

Figure 4:
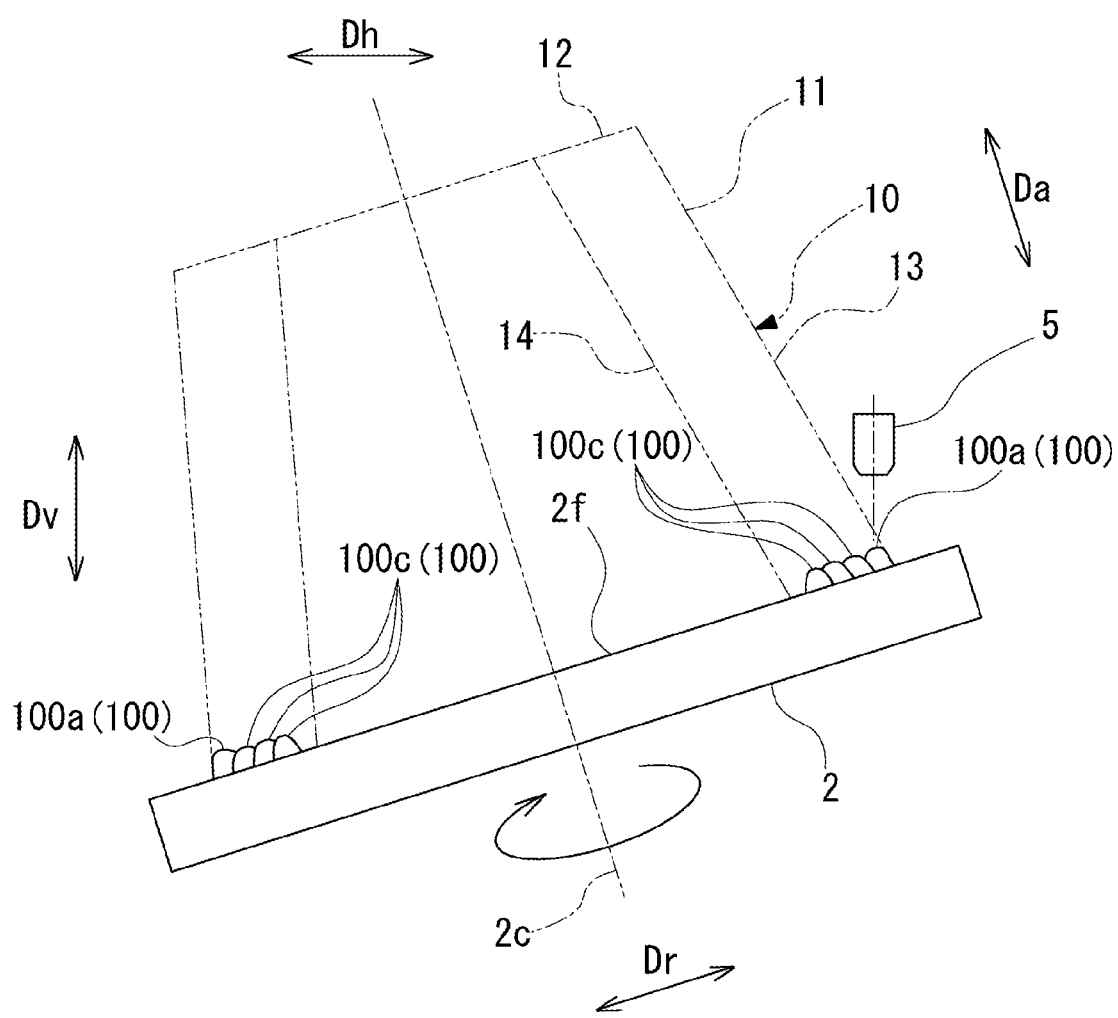
FIG. 4 is a view showing a state in which, in the metal laminating and modeling method, the table is inclined, thereby forming weld beads at an end portion on an outside in a radial direction.

As shown in FIG. 2, the first table inclination step S22 is executed after the center portion weld bead formation step S21. FIG. 4 is a view showing a state in which, in the metal laminating and modeling method, the table is inclined, thereby forming weld beads at an end portion on the outside in the radial direction. In the first table inclination step S22, as shown in FIG. 4, the table 2 is inclined from the horizontal state. Specifically, in the first table inclination step S22, the central axis 2c of the table 2 is inclined from the vertical direction Dv using the table tilting portion 4 (refer to FIG. 1), and the target surface 2f is inclined with respect to the horizontal surface. At this time, the target surface 2f faces in a first inclination direction. The first inclination direction is a direction intersecting with the vertical direction Dv when seen in the direction orthogonal to the central axis 2c. Therefore, in the first table inclination step S22, the target surface 2f faces upward in the vertical direction Dv in a state in which the central axis 2c is inclined so as to form a sharp angle with respect to the vertical direction Dv.

As shown in FIG. 2, the outer circumferential side weld bead formation step S23 is executed after the first table inclination step S22. As shown in FIG. 4, the outer circumferential side weld bead formation step S23 is carried out on the table 2 maintained in a state of being inclined in the first inclination direction in the first table inclination step S22. In the outer circumferential side weld bead formation step S23, a first end portion weld bead 100a is formed on, among the plurality of center weld beads 100c formed in the center portion weld bead formation step S21, the center weld bead 100c located at the uppermost end in the vertical direction Dv. That is, the first end portion weld bead 100a is formed in a state in which the table 2 is inclined such that the target surface 2f faces in the first inclination direction. The first end portion weld bead 100a is formed so as to overlap obliquely from above, among the center weld beads 100c, the outermost center weld bead 100c in the radial direction Dr when seen in the direction orthogonal to the central axis 2c. The first end portion weld beads 100a are continuously formed in the circumferential direction in a ring shape by rotating the table 2. The first end portion weld beads 100a form an outside region in the radial direction Dr in one metal layer 11m.

Figure 5:
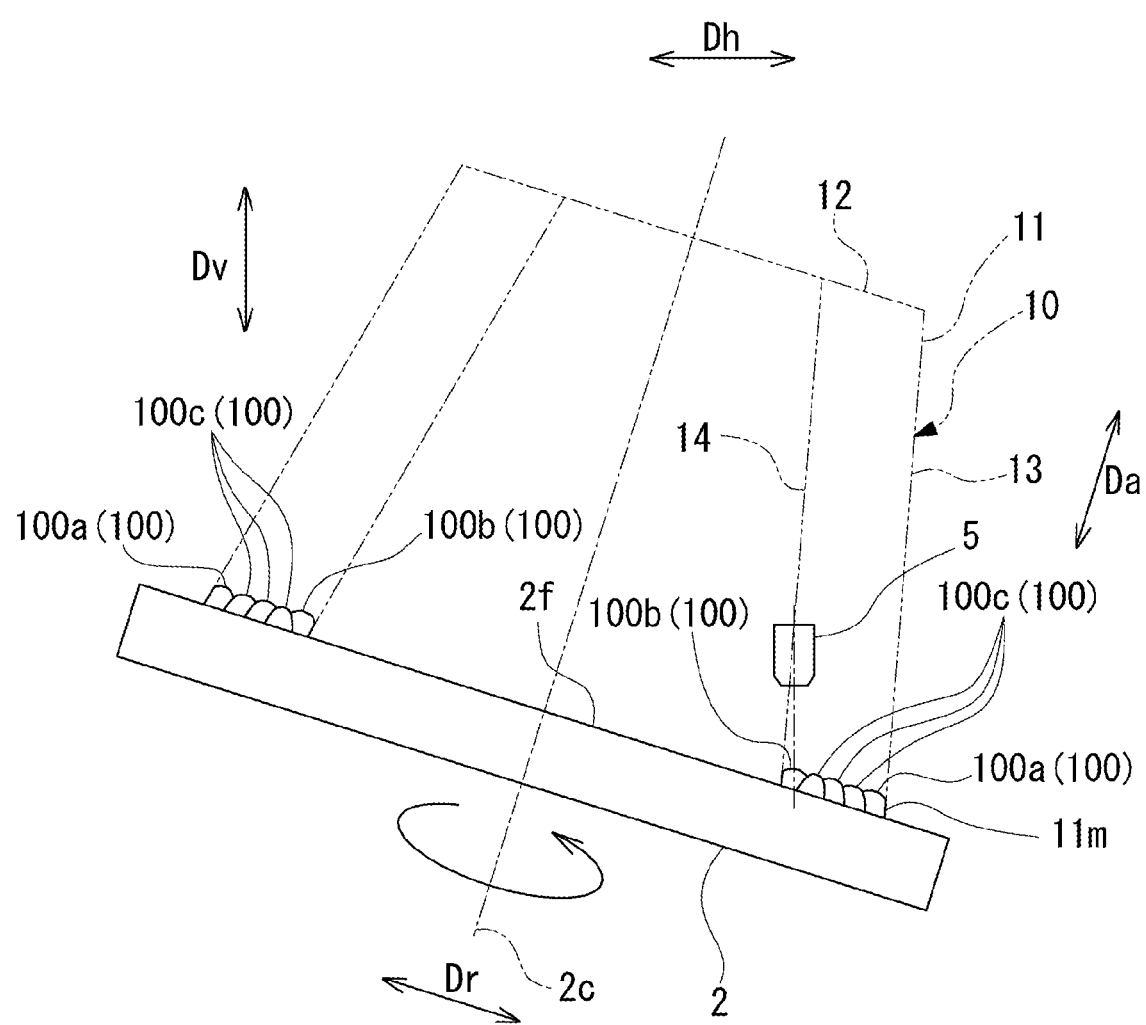
FIG. 5 is a view showing a state in which, in the metal laminating and modeling method, the table is inclined toward the opposite side compared with that in FIG. 4 with respect to a vertical direction as a standard, thereby forming weld beads at an end portion on an inside in the radial direction.

As shown in FIG. 2, the second table inclination step S24 is carried out after the outer circumferential side weld bead formation step S23. FIG. 5 is a view showing a state in which, in the metal laminating and modeling method, the table is inclined toward the opposite side compared with that in FIG. 4 with respect to the vertical direction as the standard, thereby forming weld beads at an end portion on an inside in the radial direction. In the second table inclination step S24, as shown in FIG. 5, the table 2 is inclined in a different direction from the state of being inclined in the first inclination direction. Specifically, in the second table inclination step S24, the central axis 2c of the table 2 is returned to the vertical direction Dv from the first inclination direction using the table tilting portion 4 (refer to FIG. 1) and then inclined in the opposite direction. At this time, the target surface 2f faces in a second inclination direction. The second inclination direction is a direction intersecting with the vertical direction Dv on the opposite side compared with the first inclination direction with respect to the vertical direction Dv as the standard when seen in the direction orthogonal to the central axis 2c. That is, the second inclination direction of the present embodiment is a direction inclined to the same extent as the angle of the first inclination direction with respect to the vertical direction Dv in the opposite direction when seen in the direction orthogonal to the central axis 2c. Therefore, in the second table inclination step S24, the target surface 2f faces upward in the vertical direction in a state in which the central axis 2c is inclined toward the opposite side compared with that in the first table inclination step S22 so as to form a sharp angle with respect to the vertical direction Dv.

As shown in FIG. 2, the inner circumferential side weld bead formation step S25 is carried out after the second table inclination step S24. As shown in FIG. 5, the inner circumferential side weld bead formation step S25 is carried out on the table 2 maintained in a state of being inclined in the second inclination direction in the second table inclination step S24. In the inner circumferential side weld bead formation step S25, a second end portion weld bead 100b is formed on, among the plurality of center weld beads 100c formed in the center portion weld bead formation step S21, the center weld bead 100c located at the uppermost end in the vertical direction Dv. The second end portion weld bead 100b is formed so as to overlap, among the plurality of center weld beads 100c, the center weld bead 100c located at an end opposite to the end at which the first end portion weld bead 100a is formed. That is, the second end portion weld bead 100b is formed in a state in which the table 2 is inclined such that the target surface 2f faces in the second inclination direction. The second end portion weld bead 100b is formed so as to overlap obliquely from above, among the center weld beads 100c, the innermost center weld bead 100c in the radial direction Dr when seen in the direction orthogonal to the central axis 2c. The second end portion weld beads 100b are continuously formed in the circumferential direction in a ring shape by rotating the table 2. The second end portion weld beads 100b form an inside region in the radial direction Dr in one metal layer 11m. When the inner circumferential side weld bead formation step S25 ends, as many metal layers 11m as are required to form one layer are formed.

Figure 6:
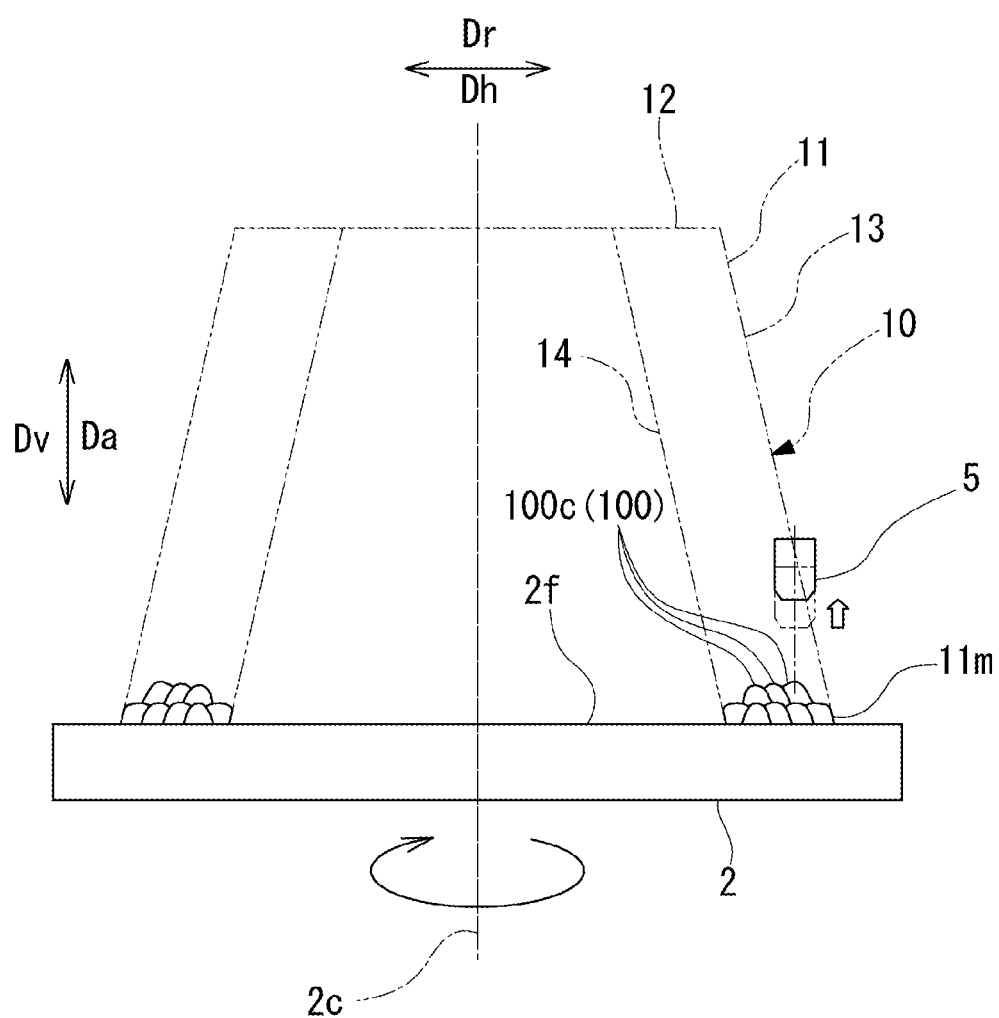
FIG. 6 is a view showing a state in which, in the metal laminating and modeling method, a nozzle is moved in an axial direction after one layer of metal layers is formed.

As shown in FIG. 2, the nozzle movement step S26 is carried out after the inner circumferential side weld bead formation step S25. FIG. 6 is a view showing a state in which, in the metal laminating and modeling method, the nozzle is moved in the axial direction after one layer of the metal layers is formed. As shown in FIG. 6, the nozzle movement step S26 moves the welding nozzle 5 in the axial direction Da as much as a dimension corresponding to the thickness of the metal layers 11m required to form one layer so as to be away from the table 2.

In the lamination number confirmation step S27, the number of the metal layers 11m laminated, which are formed by the center portion weld bead formation step S21 through the inner circumferential side weld bead formation step S25, is confirmed. For the confirmation, whether or not the number of the metal layers 11m laminated reaches a previously-set predetermined number (for example, three layers to six layers) is determined by the controller 6. As a result, when the number of the metal layers 11m laminated does not reach the predetermined number, the center portion weld bead formation step S21 is executed again. As this operation is repeated, the metal layers 11m are sequentially laminated gradually in the axial direction Da. As shown in FIG. 2, the lamination number confirmation step S27 of the present embodiment is carried out after the nozzle movement step S26. In a case where the number of the metal layers 11m laminated is determined to reach the predetermined number in the lamination number confirmation step S27, the process proceeds to the surface cutting step S28.

Figure 7:
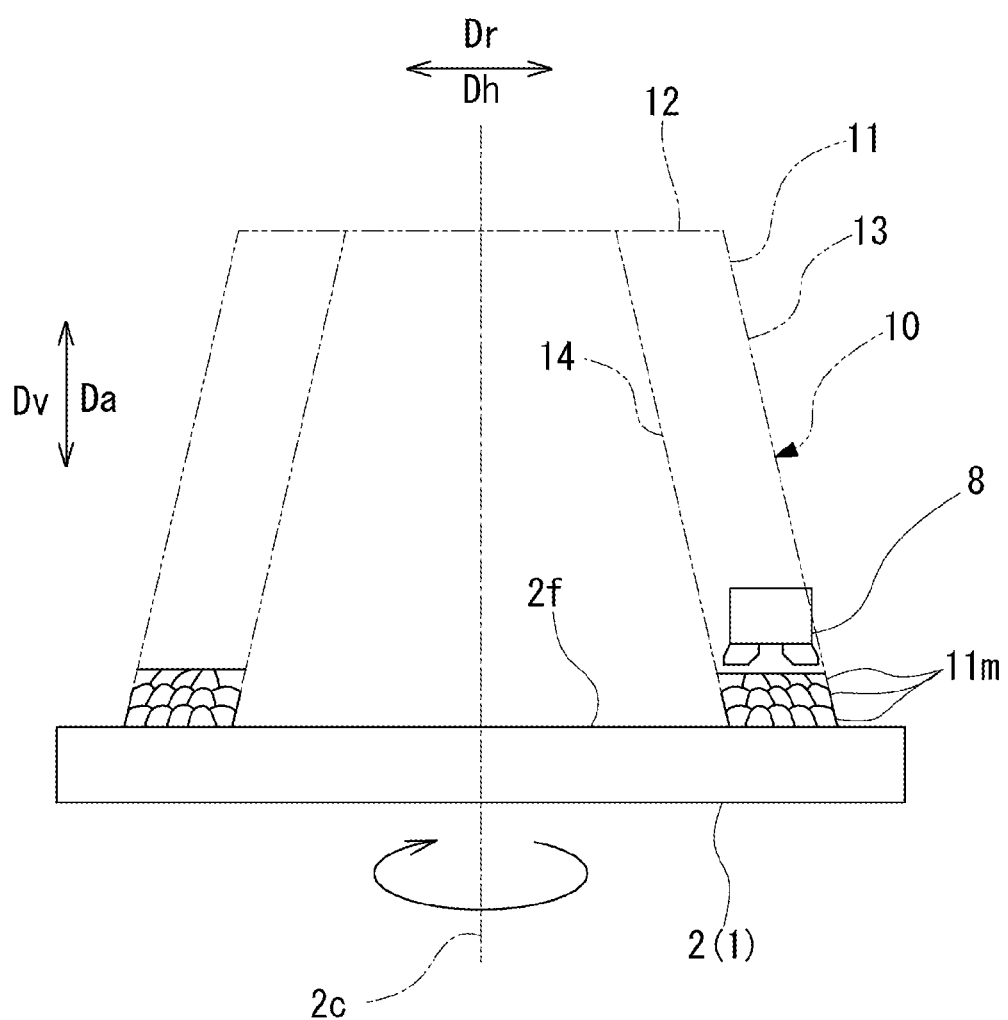
FIG. 7 is a view showing a state in which, in the metal laminating and modeling method, an upper surface of the metal layers is cut in a state in which the predetermined number of the metal layers are laminated.

FIG. 7 is a view showing a state in which, in the metal laminating and modeling method, the upper surface of the metal layers is cut in a state in which the predetermined number of the metal layers are laminated. The surface cutting step S28 is carried out after the lamination number confirmation step S27. In the surface cutting step S28, the upper surface of the predetermined number of the laminated metal layers 11m facing upward in the vertical direction Dv is cut using a cutting tool 8 and leveled to become almost a plane.

As shown in FIG. 2, the final lamination number confirmation step S29 is carried out after the surface cutting step S28. In the final lamination number confirmation step S29, whether or not the lamination number of the metal layers 11m after the upper surface has been cut reaches a previously-set final number of layers. For the confirmation, for example, whether or not the number of the metal layers 11m laminated reaches the previously-set final number of layers is determined by the controller 6. As a result, when the number of the metal layers 11m laminated after the beginning of the process does not reach the final number of layers, as shown in FIG. 2, the process returns to the center portion weld bead formation step S21, and the formation of the next layer of the metal layer 11m begins. In addition, in the final lamination number confirmation step S29, in a case where the number of the metal layers 11m laminated reaches the final number of layers, the process proceeds to the side surface formation step S3.

The side surface formation step S3 is carried out after the metal layer formation step S2 has been executed a plurality of times. In the side surface formation step S3, the table 2 is inclined such that the first end portion weld beads 100a are disposed above in the vertical direction Dv, and the plurality of weld beads 100 is formed on the plurality of first end portion weld beads 100a, thereby forming the outer circumferential surface 13. The side surface formation step S3 of the present embodiment has a third table inclination step S30 and an outer circumferential surface weld bead formation step S31.

Figure 8:
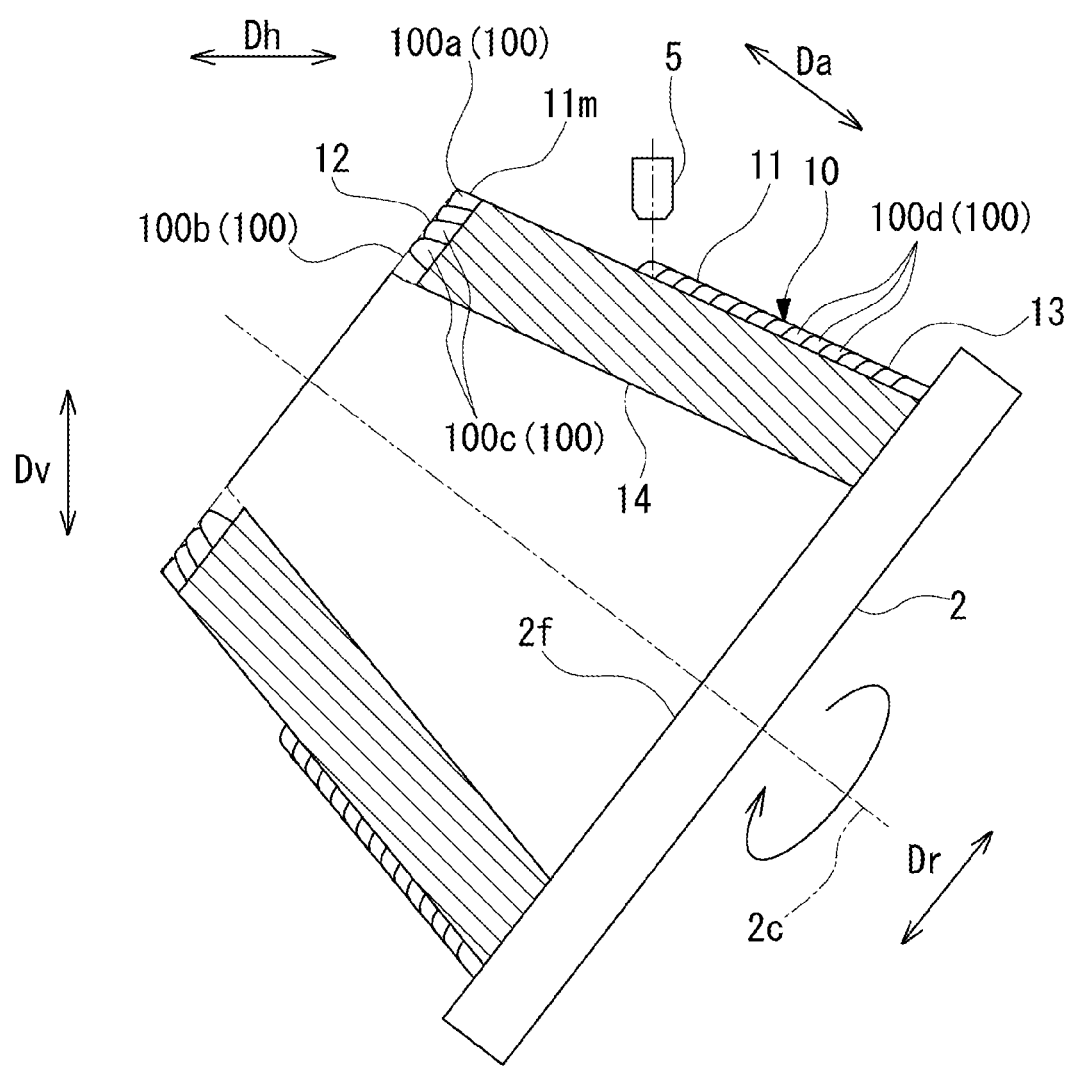
FIG. 8 is a view showing a state in which, in the metal laminating and modeling method, an outer circumferential surface of the modeled object is formed of the weld beads.

FIG. 8 is a view showing a state in which, in the metal laminating and modeling method, the outer circumferential surface of the modeled object is formed of the weld beads. As shown in FIG. 8, in the third table inclination step S30, the target surface 2f of the table 2 is inclined such that the first end portion weld beads 100a of the plurality of metal layers 11m are disposed above in the vertical direction Dv using the table tilting portion 4 (refer to FIG. 1). In the third table inclination step S30 of the present embodiment, when seen in the direction orthogonal to the central axis 2c, the target surface 2f is inclined such that the outer circumferential surface 13 to be formed becomes almost parallel to the horizontal direction. That is, in the third table inclination step S30, the table 2 is further inclined than in the first table inclination step S22.

As shown in FIG. 2, the outer circumferential surface weld bead formation step S31 is carried out after the third table inclination step S30. As shown in FIG. 8, the outer circumferential surface weld bead formation step S31 is carried out on the table 2 maintained in a state of being inclined in the third table inclination step S30. In the outer circumferential surface weld bead formation step S31, an outer circumferential surface weld bead 100d is formed so as to overlap the plurality of first end portion weld beads 100a laminated in the axial direction Da. The outer circumferential surface weld beads 100d are continuously formed in the circumferential direction in a ring shape by rotating the table 2. The outer circumferential surface weld beads 100d are formed across a plurality of rows while moving the welding nozzle 5 in the axial direction Da. Therefore, the plurality of outer circumferential surface weld beads 100d is formed side by side in the axial direction Da with no gap therebetween. As a result, the entire outer circumferential surface 13 of the tubular portion 11 is formed of the outer circumferential surface weld beads 100d. The modeled object 10 having a predetermined shape is formed on the table 2 as described above.

As shown in FIG. 2, the modeled object removal step S4 is carried out after the side surface formation step S3. In the modeled object removal step S4, the modeled object 10 formed on the table 2 is separated and removed from the table 2. Therefore, the modeling of the modeled object 10 ends.

According to the above-described metal laminating and modeling method S1, when the table 2 is inclined in the first table inclination step S22, the target surface 2f inclines. In the outer circumferential side weld bead formation step S23, in this state, the first end portion weld beads 100a are formed so as to overlap, among the plurality of center weld beads 100c arranged on the target surface 2f, the outermost center weld beads 100c in the radial direction Dr at the upper end. As a result, at a point in time at which the first end portion weld beads 100a are formed using the welding nozzle 5, the first end portion weld beads 100a are located above the center weld beads 100c when seen in the direction orthogonal to the central axis 2c. At the moment of being formed, the first end portion weld bead 100a is in a molten state and thus flows inward in the radial direction Dr toward the center weld beads 100c due to the force of gravity. That is, the first end portion weld bead 100a does not flow to the outside in the radial direction Dr where the center weld beads 100c are not formed. As a result, it is possible to prevent the outer circumferential surface 13 of the modeled object 10 from forming a shape having large protrusions and recesses due to the plurality of first end portion weld beads 100a that hangs down. Therefore, it is possible to produce a favorable modeled object having a small number of protrusions and recesses even when the outer circumferential surface 13 of the modeled object 10 is not pruned. Therefore, the quality of the modeled object 10 can be improved without carrying out an additive process or the like.

Furthermore, the first end portion weld bead 100a in a molten state is blocked by the center weld bead 100c. That is, the first end portion weld bead 100a is not capable of flowing downward past the center weld bead 100c. Therefore, the first end portion weld bead 100a hanging and adversely affecting the inside region in the radial direction Dr is suppressed.

Similarly, when the table 2 is inclined in the second table inclination step S24, the target surface 2f inclines. In the inner circumferential side weld bead formation step S25, in this state, the second end portion weld beads 100b are formed so as to overlap, among the plurality of center weld beads 100c arranged in the horizontal direction on the target surface 2f, the innermost center weld beads 100c in the radial direction Dr at the upper end. As a result, at a point in time at which the second end portion weld beads 100b are formed using the welding nozzle 5, the second end portion weld beads 100b are located above the center weld beads 100c when seen in the direction orthogonal to the central axis 2c. At the moment of being formed, the second end portion weld bead 100b is in a molten state and thus flows outward in the radial direction Dr toward the center weld beads 100c due to the force of gravity. That is, the second end portion weld bead 100b does not flow to the inside in the radial direction Dr where the center weld beads 100c are not formed. As a result, it is possible to prevent the inner circumferential surface 14 of the modeled object 10 from forming a shape having large protrusions and recesses due to the plurality of second end portion weld beads 100b that hangs down. Therefore, it is possible to produce a favorable modeled object having a small number of protrusions and recesses even when the inner circumferential surface 14 of the modeled object 10 is not pruned. Therefore, it is possible to improve the qualities of two different surfaces intersecting with the main surface 12 of the modeled object 10 without carrying out an additive process or the like.

Furthermore, the second end portion weld bead 100b in a molten state is blocked by the center weld bead 100c. That is, the second end portion weld bead 100b is not capable of flowing downward past the center weld bead 100c. Therefore, the second end portion weld bead 100b hanging and adversely affecting the outside region in the radial direction Dr is suppressed.

In addition, at the time of forming the first end portion weld beads 100a or the second end portion weld beads 100b, only the table 2 may be inclined, and a temperature sensor or the like is not necessary, and thus it is possible to suppress an increase in facility costs. Furthermore, it is not necessary to wait for the weld beads 100 to lower to a predetermined temperature, and thus the modeling time can be shortened. Therefore, it becomes possible to suppress an increase in facility costs, suppress the extension of modeling time, and form the modeled object 10 with a favorable quality.

In addition, when seen in the direction orthogonal to the central axis 2c, the table 2 is inclined such that the outer circumferential surface 13 to be formed becomes almost parallel to the horizontal direction. In this state, the outer circumferential surface weld beads 100d are formed so as to overlap the plurality of first end portion weld beads 100a. Therefore, even when there are a small number of protrusions and recesses or the like on the surface of the first end portion weld beads 100a arranged in the axial direction Da, the protrusions and the recesses are buried by the outer circumferential surface weld beads 100d to be newly formed. As a result, a leveled outer circumferential surface 13 is formed. Therefore, it is possible to further enhance the finish quality of the outer circumferential surface 13 and make the cutting process time of the outer circumferential surface 13 short or unnecessary.

In addition, the metal layers 11m having the first end portion weld beads 100a and the second end portion weld beads 100b are sequentially laminated in the axial direction Da, whereby it is possible to trim the outer circumferential surface 13 and the inner circumferential surface 14 without carrying out an additive process or the like. Therefore, it is possible to enhance the quality of the modeled object 10 to be formed and make the cutting process times of the outer circumferential surface 13 and the inner circumferential surface 14 short or unnecessary.

Particularly, when the modeled object 10 has the tubular portion 11 as in the present embodiment, the outer circumferential surface 13 or the inner circumferential surface 14 forms a shape curving in the circumferential direction. Therefore, there is a case where time is taken at the time of carrying out an additive process on the outer circumferential surface 13 or the inner circumferential surface 14. In addition, there is a case where, depending on the size or shape of the tubular portion 11, the insertion of a tool or the like into the inner circumferential surface 14 is difficult, and an additive process is difficult. However, according to the metal laminating and modeling method S1 of the present embodiment, it is possible to form the modeled object 10 having a high quality without carrying out any additive process. Therefore, even for the modeled object 10 having the tubular portion 11, it becomes possible to suppress an increase in facility costs, suppress the extension of modeling time, and obtain a favorable quality.

Hitherto, the embodiment of the present invention has been described in detail with reference to the drawings, but the respective configurations in the embodiment, a combination thereof, and the like are an example, and the addition, omission, substitution, and other modifications of the configuration are possible within the scope of the gist of the present invention. In addition, the present invention is not limited to the embodiment and only limited by the claims.

For example, the shape to be formed of the modeled object 10 is simply an example and may be an appropriate different shape. For example, the modeled object 10 may a cylindrical shape, a rectangular cylindrical shape, or the like having a constant diameter dimension in the axial direction Da. In addition, the modeled object 10 is not limited to a tubular shape and may be, for example, a plate shape or the like as long as the modeled object has the main surface 12 and a side surface intersecting with the main surface 12.

In addition, in the present embodiment, the first end portion weld beads 100a are formed in the outer circumferential side weld bead formation step S23, and the second end portion weld beads 100b are formed in the inner circumferential side weld bead formation step S25. However, the metal laminating and modeling method S1 is not limited to the configuration in which both the outer circumferential side weld bead formation step S23 and the inner circumferential side weld bead formation step S25 are carried out. That is, in the metal laminating and modeling method S1, only one of the outer circumferential side weld bead formation step S23 and the inner circumferential side weld bead formation step S25 may be carried out. Therefore, at the time of carrying out only the inner circumferential side weld bead formation step S25, the weld beads 100 formed in the inner circumferential side weld bead formation step S25 become the first end portion weld beads.

In addition, in the embodiment, the upper surface of the metal layers 11m is cut using the cutting tool 8 each time when the predetermined number of metal layers 11m are laminated in the surface cutting step S28, but the present invention is not limited thereto. The surface cutting step S28 may be omitted, and the metal layers 11m may be sequentially laminated until the final layer of the metal layer 11m.

In addition, in the embodiment, in the outer circumferential surface weld bead formation step S31, the outer circumferential surface weld beads 100d are formed using the welding nozzle 5, thereby forming the outer circumferential surface 13, but the present invention is not limited to the above-described formation of the outer circumferential surface 13. For example, the outer circumferential surface weld bead formation step S31 may be omitted. In this case, regarding the outer circumferential surface 13, a surface formed of the first end portion weld beads 100a sequentially laminated becomes the outer circumferential surface of the tubular portion 11.

EXPLANATION OF REFERENCES

1 MODELING SYSTEM
2 TABLE
2c CENTRAL AXIS
2f TARGET SURFACE
3 TABLE ROTARY-DRIVING PORTION
4 TABLE TILTING PORTION
5 WELDING NOZZLE
6 CONTROLLER
8 CUTTING TOOL
10 MODELED OBJECT
11 TUBULAR PORTION
11a TUBE END
11b TUBE END
11m METAL LAYER
12 MAIN SURFACE
12a OUTSIDE END PORTION
12b INSIDE END PORTION
13 OUTER CIRCUMFERENTIAL SURFACE (SIDE SURFACE)
14 INNER CIRCUMFERENTIAL SURFACE (SIDE SURFACE)
100 WELD BEAD
100a FIRST END PORTION WELD BEAD
100b SECOND END PORTION WELD BEAD
100c CENTER WELD BEAD
100d OUTER CIRCUMFERENTIAL SURFACE WELD BEAD
Da AXIAL DIRECTION
Dr RADIAL DIRECTION
Dv VERTICAL DIRECTION
S1 METAL LAMINATING AND MODELING METHOD

S2 METAL LAYER FORMATION STEP
S3 SIDE SURFACE FORMATION STEP
S4 MODELED OBJECT REMOVAL STEP
S21 CENTER PORTION WELD BEAD FORMATION STEP
S22 FIRST TABLE INCLINATION STEP
S23 OUTER CIRCUMFERENTIAL SIDE WELD BEAD FORMATION STEP
S24 SECOND TABLE INCLINATION STEP
S25 INNER CIRCUMFERENTIAL SIDE WELD BEAD FORMATION STEP
S26 NOZZLE MOVEMENT STEP
S27 LAMINATION NUMBER CONFIRMATION STEP
S28 SURFACE CUTTING STEP
S29 FINAL LAMINATION NUMBER CONFIRMATION STEP
S30 THIRD TABLE INCLINATION STEP
S31 OUTER CIRCUMFERENTIAL SURFACE WELD BEAD FORMATION STEP

What is claimed is:

1. A metal laminating and modeling method for modeling a three-dimensional modeled object having a main surface and a side surface extending in a direction intersecting with the main surface from an end portion of the main surface by sequentially laminating metal layers, the method comprising:
a metal layer formation step of individually forming each of the metal layers by forming, via arc welding, weld beads arranged in a horizontal direction on a table having a target surface on which the metal layer is formed, the weld beads including:
one or more first end portion weld beads that form an outside region of the metal layer in a radial direction of the metal layer;
one or more second end portion weld beads that form an inside region of the metal layer in the radial direction of the metal layer; and
center portion weld beads that form a center portion of the metal layer, wherein the metal layer formation step is repeated such that the weld beads are laminated on the formed metal layers,
the metal layer formation step comprises:
a center portion weld bead formation step of setting the table in a horizontal state such that the target surface faces upward in a vertical direction and forming the center portion weld beads to overlap in a direction in which the target surface extends;
a first end portion weld bead formation step of:
inclining the table such that the target surface faces a first inclination direction intersecting with the vertical direction; and
forming the one or more first end portion weld beads to overlap one of the center portion weld beads located at an uppermost end in the vertical direction; and
a second end portion weld bead formation step of:
inclining the table such that the target surface faces a second inclination direction that is opposite to the first inclination direction; and
forming the one or more second end portion weld beads to overlap one of the center portion weld beads located at an end opposite to the end at which the one or more first end portion weld beads are formed, wherein
when the table is inclined, the one or more second end portion weld beads are located above the center portion weld beads in the vertical direction.

2. The metal laminating and modeling method according to claim 1, further comprising:
a side surface formation step of:
inclining the table such that the one or more first end portion weld beads are disposed above the center portion weld beads; and
forming side surface weld beads on the one or more first end portion weld beads to form the side surface, wherein
the side surface formation step is performed after all of the metal layers are formed by repeating the metal layer formation step.

3. The metal laminating and modeling method according to claim 2, wherein
the modeled object has a tubular portion extending in an axial direction,
the main surface is a surface extending so as to intersect with the axial direction in at least one end portion of the tubular portion in the axial direction, and
the side surface is an outer circumferential surface of the tubular portion.

4. The metal laminating and modeling method according to claim 1, wherein
the modeled object has a tubular portion extending in an axial direction,
the main surface is a surface extending so as to intersect with the axial direction in at least one end portion of the tubular portion in the axial direction, and
the side surface is at least one of an outer circumferential surface and an inner circumferential surface of the tubular portion.

* * * * *

UNITED STATES PATENT AND TRADEMARK OFFICE
CERTIFICATE OF CORRECTION

PATENT NO. : 11,400,536 B2
APPLICATION NO. : 16/843193
DATED : August 2, 2022
INVENTOR(S) : Sakai et al.

Page 1 of 1

It is certified that error appears in the above-identified patent and that said Letters Patent is hereby corrected as shown below:

On the Title Page

Item (12), should read:
Sakai et al.

Item (72), should read:
Yasunori Sakai, Hiroshima (JP);
Kazuhiro Ishibashi, Aichi (JP);
Yasuyuki Tanaka, Aichi (JP);
Atsushi Suzuki, Aichi (JP);
Seigo Ouchi, Aichi (JP)

Signed and Sealed this
Nineteenth Day of August, 2025

Coke Morgan Stewart
*Acting Director of the United States Patent and Trademark Office*